United States Patent
Ouyang et al.

(10) Patent No.: US 9,608,551 B2
(45) Date of Patent: Mar. 28, 2017

(54) REDUCING PEAK FAULT OUTPUT CURRENT IN A DC POWER GENERATION SYSTEM

(71) Applicant: ABB Schweiz AG, Baden (CH)

(72) Inventors: Wen Ouyang, Raleigh, NC (US); Jiaqi Liang, Cary, NC (US); Li Qi, Cary, NC (US)

(73) Assignee: ABB Schweiz AG, Baden (CH)

( * ) Notice: Subject to any disclaimer, the term of this patent is extended or adjusted under 35 U.S.C. 154(b) by 20 days.

(21) Appl. No.: 14/828,079

(22) Filed: Aug. 17, 2015

(65) Prior Publication Data

US 2017/0054393 A1     Feb. 23, 2017

(51) Int. Cl.
| | |
|---|---|
| *H02P 9/10* | (2006.01) |
| *H02P 9/14* | (2006.01) |
| *H02K 3/16* | (2006.01) |
| *H02P 9/00* | (2006.01) |
| *H02K 11/04* | (2016.01) |
| *H02K 1/10* | (2006.01) |

(52) U.S. Cl.
CPC ............ *H02P 9/006* (2013.01); *H02K 3/16* (2013.01); *H02K 11/046* (2013.01)

(58) Field of Classification Search
USPC ............................................ 322/88; 310/183
See application file for complete search history.

(56) References Cited

U.S. PATENT DOCUMENTS

| | | | | |
|---|---|---|---|---|
| 1,908,158 A | * | 5/1933 | Mortensen ............. | H02K 19/14 310/183 |
| 2,303,481 A | | 12/1942 | Liwschitz | |
| 2,456,983 A | * | 12/1948 | Morse ...................... | H02K 3/20 310/183 |
| 2,470,522 A | * | 5/1949 | Rankin ..................... | H02K 3/20 310/183 |
| 2,752,518 A | * | 6/1956 | Ringland .................. | H02K 3/20 310/183 |
| 3,654,503 A | * | 4/1972 | Whitney ................. | H02K 19/14 310/162 |
| 3,749,991 A | * | 7/1973 | Kuniyoshi ............. | H02K 29/06 310/183 |
| 3,793,546 A | * | 2/1974 | King, Jr. .................. | H02K 3/20 310/183 |

(Continued)

*Primary Examiner* — Pedro J Cuevas
(74) *Attorney, Agent, or Firm* — Barnes & Thornburg LLP

(57) ABSTRACT

Technologies for reducing peak fault output current in a DC power generation system include a generator having a reduced damper winding and a controller to control a rectifier array to generate a DC power output. In some embodiments, the generator may have no damper windings, may have damper windings including a reduced number of damper bars, and/or may have damper windings having separated end ring mounts for each damper bar. The controller is configured to control the rectifier array so as to reduce oscillations of the DC output that may be due to the reduced damper windings. To do so, the controller is configured to generate the control signal based on an oscillation component of the DC power output. For example, the controller may generate an oscillation correction signal based on the DC power output and adjust a firing angle set point of the rectifier array based on the oscillation correction signal.

20 Claims, 11 Drawing Sheets

(56) References Cited

U.S. PATENT DOCUMENTS

| | | | | |
|---|---|---|---|---|
| 3,899,704 | A | * | 8/1975 | Leistner .................. H02K 3/20 |
| | | | | 310/183 |
| 5,177,392 | A | * | 1/1993 | Scott ....................... H02K 1/02 |
| | | | | 310/183 |
| 7,504,756 | B2 | * | 3/2009 | Caprio ................ H02K 17/165 |
| | | | | 310/211 |
| 2006/0273683 | A1 | * | 12/2006 | Caprio ................ H02K 17/165 |
| | | | | 310/211 |
| 2013/0181568 | A1 | * | 7/2013 | Bangura ............... H02K 19/22 |
| | | | | 310/183 |
| 2014/0028144 | A1 | * | 1/2014 | Parviainen ............ H02K 1/223 |
| | | | | 310/210 |
| 2015/0318774 | A1 | * | 11/2015 | Tremelling .......... H02K 21/042 |
| | | | | 310/68 B |

\* cited by examiner

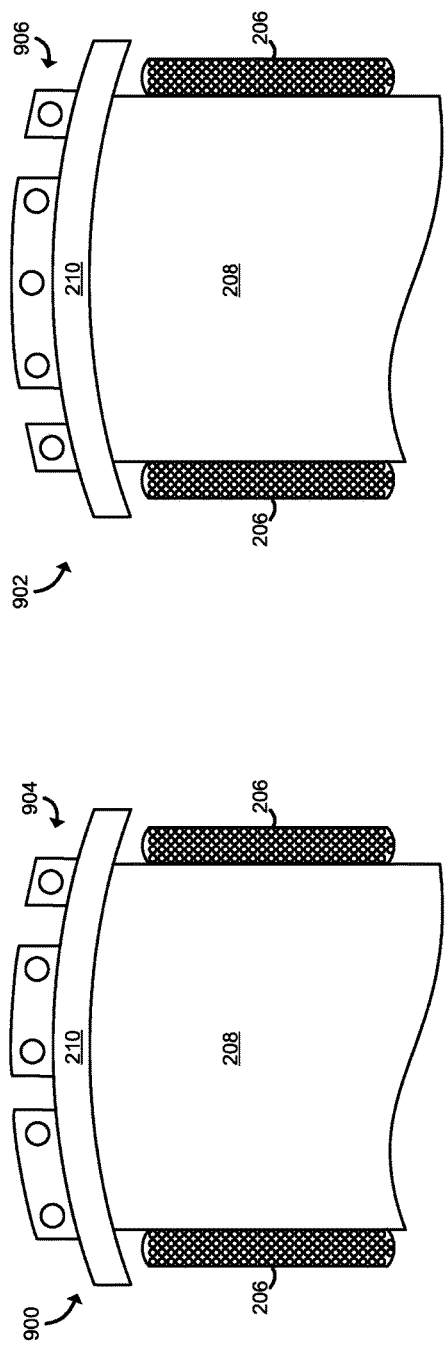
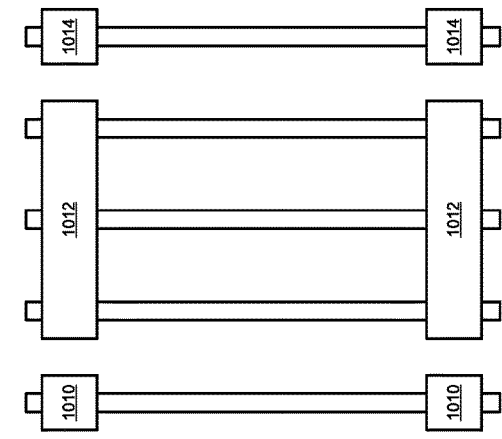
FIG. 9
FIG. 10

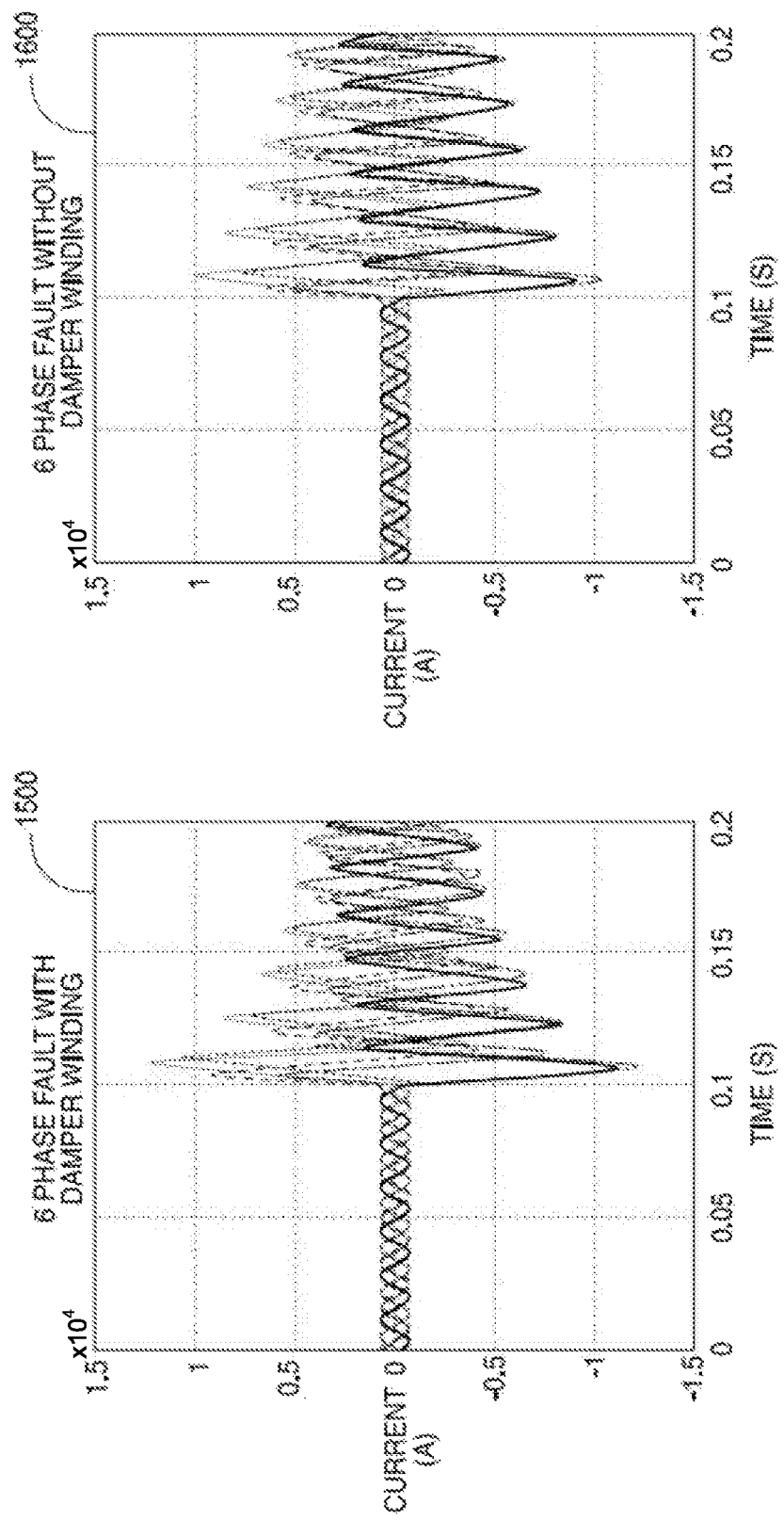

REDUCING PEAK FAULT OUTPUT CURRENT IN A DC POWER GENERATION SYSTEM

BACKGROUND

Direct current (DC) power generation systems are used in many applications to provide DC power to a load. Typical DC power generation systems include a generator that produces an alternating current (AC) power output in response to an excitation and a rectifier to rectify the AC power output to a DC power output. A typical generator includes a rotor having two or more rotor poles and a stator surrounding the rotor. Each rotor pole includes a corresponding field winding, which produces a magnetic field when the rotor is rotated. The stator includes armature or stator windings in which an AC voltage is generated in response to the magnetic field produced by the rotating rotor. The stator windings may include one or more phase windings (e.g., single phase, three-phase, etc.). In many commercial applications, the generator is designed as a synchronous generator in which the frequency of the AC output is synchronized with the rotational speed of the rotor.

In synchronous generators, overall generator torque is based on the flux distribution of the air gap between the rotor and stator. The air gap flux distribution is generated based on the magnetic interaction between the field windings of the rotor and the armature windings of the stator. Fluctuations in the air gap flux can be caused by sudden changes in a load of a synchronous generator (e.g., a short circuit), which result in oscillations in the output of the generator. To alleviate the air gap flux fluctuations, typical synchronous generators include damper windings on each rotor pole of the rotor. During operation, a current is induced in the damper windings, which causes a cancellation magnetic field to be produced to reduce the fluctuations of the air gap flux and any torque pulsations. However, due to the cancellation magnetic field, the stator main flux transfers through the side of each rotor pole, which reduces the direct-quadrature (dq) axis reactance and can result in high short circuit current during the initial stage of a fault event (e.g., a short circuit).

SUMMARY

Accordingly to an aspect, a direct current (DC) power generation system for reducing peak fault output current may include a generator, a rectifier array, and a controller electrically coupled to the rectifier array to control operation of the rectifier array. The generator may be configured to generate an alternating current (AC) power output in response to an excitation and may include a plurality of rotor poles. Each rotor pole may include a corresponding damper winding and each damper winding may include a plurality of damper bars secured to the corresponding rotor pole by a pair of end rings. Each end ring may include at least two end ring mounts electrically isolated from each other, and each end ring mount may secure at least one damper winding to the corresponding rotor pole. The rectifier array may be configured to convert the AC power output to a DC power output in response to a control signal. The controller may be configured to generate the control signal based on an oscillation component of the DC power output.

In some embodiments, each end ring may include a plurality of end ring mounts, and each end ring mount may secure one of the plurality of damper bars to the corresponding rotor pole, wherein each end ring mount is electrically isolated from each other end ring mount. Alternatively, in some embodiments, the at least two end ring mounts may include a first end ring mount and a second end ring mount, and each of the first and second end ring mounts may secure a different number of damper bars to the corresponding rotor pole. Additionally, in some embodiments, the end ring mounts of the end ring may define a damper winding configuration of the corresponding damper winding, and the at least two rotor poles of the plurality of rotor poles may include damper windings having different damper winding configurations.

In some embodiments, the controller may be configured to generate an oscillation correction signal and adjust a firing angle set point based on the oscillation correction signal to generate the control signal. Additionally, in such embodiments, the controller may be configured to receive a measurement signal indicative of a DC current of the DC power output, apply a phase compensation to the measurement signal to generate a compensated measurement signal, and apply a gain to the compensated measurement signal to generate the oscillation correction signal. In some embodiments, the controller may include a noise filter configured to receive the measurement signal and filter the measurement signal to generate a filtered measurement signal; a phase compensation circuit coupled to the noise filter to receive the filtered measurement signal and configured to apply the phase compensation to the filtered measurement signal to generate the compensated measurement signal; and a gain circuit coupled to the phase compensation circuit to receive the compensated measurement signal and configured to apply the gain to the compensated measurement signal to generate the oscillation correction signal.

In some embodiments, the controller may be configured to receive a measurement signal indicative of a DC current of the DC power output, separate the measurement signal into a DC component signal and a oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal. Additionally, in such embodiments, the controller may include a noise filter configured to receive the measurement signal and filter the measurement signal to generate a filtered measurement signal; a low pass filter coupled to the noise filter to receive the filtered measurement signal and filter the filtered measurement signal to generate the DC component signal; a first summation circuit coupled to the noise filter to receive the filtered measurement signal and to the low pass filter to receive the DC component signal, wherein the first summation circuit is configured to subtract the DC component signal from the filtered measurement signal to generate the oscillation component signal; a phase compensation circuit coupled to the first summation circuit to receive the oscillation component signal and configured to apply the phase compensation to the oscillation component signal to generate the compensated oscillation component signal; an oscillation damping gain circuit coupled to the phase compensation circuit to receive the compensated oscillation component signal and configured to apply the oscillation damping gain to the compensated oscillation component signal to generate the adjusted oscillation component signal; a voltage droop gain circuit coupled to the low pass filter to receive the DC component signal and configured to apply the voltage droop gain to the DC component signal to generate the adjusted DC component signal; and a second summation circuit coupled to the oscillation damping gain circuit to receive the adjusted oscillation component signal and to the voltage droop gain circuit to receive the adjusted DC component signal, wherein the second summation circuit is configured to sum the adjusted oscillation component signal and the adjusted DC component signal to generate the oscillation correction signal.

Additionally, in some embodiments, the controller may be configured to determine the cosine of the firing angle set point to generate a command value, subtract the oscillation correction signal from the command value to generate a corrected command value, determine an inverse cosine of the target value to generate a command firing angle, and apply a phase limiter to the command firing angle to limit the command firing angle within a reference angle range to generate the control signal.

According to another aspect, a direct current (DC) power generation system for generating a DC power output having reduced peak fault output current may include a controller coupled to a rectifier array of the DC power generation system and to generate a control signal to control operation of the rectifier array to generate the DC power output, wherein the controller is configured to generate an oscillation correction signal and adjust a firing angle set point based on the oscillation correction signal to generate the control signal. In some embodiments, the controller may be configured to receive a measurement signal indicative of a DC current of the DC power output, apply a phase compensation to the measurement signal to generate a compensated measurement signal, and apply a gain to the compensated measurement signal to generate the oscillation correction signal. Additionally, in such embodiments, the controller may include a noise filter configured to receive the measurement signal and filter the measurement signal to generate a filtered measurement signal; a phase compensation circuit coupled to the noise filter to receive the filtered measurement signal and configured to apply the phase compensation to the filtered measurement signal to generate the compensated measurement signal; and a gain circuit coupled to the phase compensation circuit to receive the compensated measurement signal and configured to apply the gain to the compensated measurement signal to generate the oscillation correction signal.

In some embodiments, the controller may be configured to receive a measurement signal indicative of a DC current of the DC power output, separate the measurement signal into a DC component signal and a oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal. Additionally, in such embodiments, the controller may include a noise filter configured to receive the measurement signal and filter the measurement signal to generate a filtered measurement signal; a low pass filter coupled to the noise filter to receive the filtered measurement signal and filter the filtered measurement signal to generate the DC component signal; a first summation circuit coupled to the noise filter to receive the filtered measurement signal and to the low pass filter to receive the DC component signal, wherein the first summation circuit is configured to subtract the DC component signal from the filtered measurement signal to generate the oscillation component signal; a phase compensation circuit coupled to the first summation circuit to receive the oscillation component signal and configured to apply the phase compensation to the oscillation component signal to generate the compensated oscillation component signal; a oscillation damping gain circuit coupled to the phase compensation circuit to receive the compensated oscillation component signal and configured to apply the oscillation damping gain to the compensated oscillation component signal to generate the adjusted oscillation component signal; a voltage droop gain circuit coupled to the low pass filter to receive the DC component signal and configured to apply the voltage droop gain to the DC component signal to generate the adjusted DC component signal; and a second summation circuit coupled to the oscillation damping gain circuit to receive the adjusted oscillation component signal and to the voltage droop gain circuit to receive the adjusted DC component signal, wherein the second summation circuit is configured to sum the adjusted oscillation component signal and the adjusted DC component signal to generate the oscillation correction signal.

Additionally, in some embodiments, the controller may be configured to determine the cosine of the firing angle set point to generate a command value, subtract the oscillation correction signal from the command value to generate a corrected command value, determine an inverse cosine of the target value to generate a command firing angle, and apply a phase limiter to the command firing angle to limit the command firing angle within a reference angle range to generate the control signal.

According to a further aspect, a direct current (DC) power generation system for reducing peak fault output current may include a generator, a rectifier array, and a controller electrically coupled to rectifier array to control operation of the rectifier array. The generator may be configured to generate an alternating current (AC) power output in response to an excitation, wherein the generator includes a plurality of rotor poles and each rotor pole has no damper winding. The rectifier array may be configured to convert the AC power output to a DC power output in response to a control signal. Additionally, the controller may be configured to generate the control signal based on an oscillation component of the DC power output.

In some embodiments, the controller is configured to generate an oscillation correction signal and adjust a firing angle set point based on the oscillation correction signal to generate the control signal. Additionally, in such embodiments, the controller may be configured to receive a measurement signal indicative of a DC current of the DC power output, apply a phase compensation to the measurement signal to generate a compensated measurement signal, and apply a gain to the compensated measurement signal to generate the oscillation correction signal. In some embodiments, the controller may include a noise filter configured to receive the measurement signal and filter the measurement signal to generate a filtered measurement signal; a phase compensation circuit coupled to the noise filter to receive the filtered measurement signal and configured to apply the phase compensation to the filtered measurement signal to generate the compensated measurement signal; and a gain circuit coupled to the phase compensation circuit to receive the compensated measurement signal and configured to apply the gain to the compensated measurement signal to generate the oscillation correction signal.

Additionally, in some embodiments, the controller may be configured to receive a measurement signal indicative of a DC current of the DC power output, separate the measurement signal into a DC component signal and a oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal. In such embodiments, the controller may include a noise filter configured to receive the measurement signal and filter the measurement signal to generate a filtered measurement signal; a low pass filter coupled to the noise filter to receive the filtered measurement signal and filter the filtered measurement signal to generate the DC component signal; a first summation circuit coupled to the noise filter to receive the filtered measurement signal and to the low pass filter to receive the DC component signal, wherein the first summation circuit is configured to subtract the DC component signal from the filtered measurement signal to generate the oscillation component signal; a phase compensation circuit coupled to the first summation circuit to receive the oscillation component signal and configured to apply the phase compensation to the oscillation component signal to generate the compensated oscillation component signal; a oscillation damping gain circuit coupled to the phase compensation circuit to receive the compensated oscillation component signal and configured to apply the oscillation damping gain to the compensated oscillation component signal to generate the adjusted oscillation component signal; a voltage droop gain circuit coupled to the low pass filter to receive the DC component signal and configured to apply the voltage droop gain to the DC component signal to generate the adjusted DC component signal; and a second summation circuit coupled to the oscillation damping gain circuit to receive the adjusted oscillation component signal and to the voltage droop gain circuit to receive the adjusted DC component signal, wherein the second summation circuit is configured to sum the adjusted oscillation component signal and the adjusted DC component signal to generate the oscillation correction signal.

Additionally, in some embodiments, the controller may be configured to determine the cosine of the firing angle set point to generate a command value, subtract the oscillation correction signal from the command value to generate a corrected command value, determine an inverse cosine of the target value to generate a command firing angle, and apply a phase limiter to the command firing angle to limit the command firing angle within a reference angle range to generate the control signal.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 9 is a simplified illustration of at least one embodiment of a pair of rotor poles of the generator of FIG. 2 having alternating reduced damper windings;

FIG. 10 is a simplified illustration of the reduced damper windings of the rotor poles of FIG. 9;

FIG. 15 is a simplified graph of a simulated fault output current of a DC power generation system having a typical damper winding; and FIG. 16 is a simplified graph of a simulated fault output current of the DC power generation system of the DC power system of FIG. 1 having a reduced damper winding.

DETAILED DESCRIPTION OF THE DRAWINGS

Figure 1:
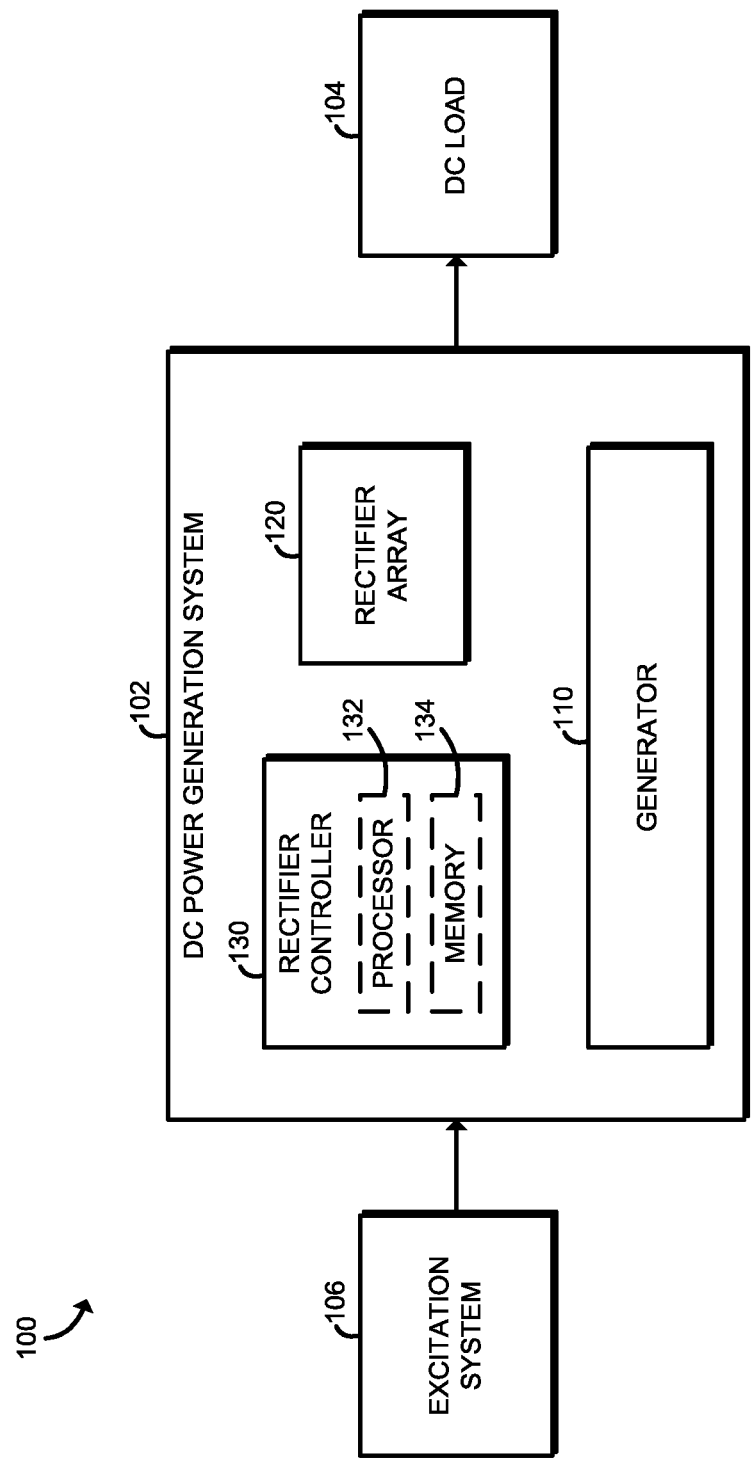
FIG. 1 is a simplified block diagram of at least one embodiment of a direct current (DC) power system including a DC power generation system and a DC load.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative direct current (DC) power system 100 includes a DC power generation system 102 configured to generate a DC power output to a DC load 104 in response to an excitation from an excitation system 106. The DC power generation system 102 includes a generator 110 configured to produce an AC power output in response to the excitation, a rectifier array 120 configured to convert the AC power output from the generator to the DC power output, and a rectifier controller 130 configured to control operation of the rectifier array 120. As discussed in more detail below, the generator 110 includes a reduced damper winding on each rotor of the generator 110, which reduces the peak fault current of the generator 110. However, the reduction or elimination of the damper winding also increases the sub-transient and transient DC output inductance of the DC power generation system 102. The reduction of the DC output inductance may cause oscillations, or even instability, in the DC power generation system 102. To compensate for such oscillations, the rectifier controller 130 is configured to adjust the firing angle of the rectifier array 120 based on the oscillations present in the DC power output of the DC power generation system 102 as discussed in detail below.

Figure 2:
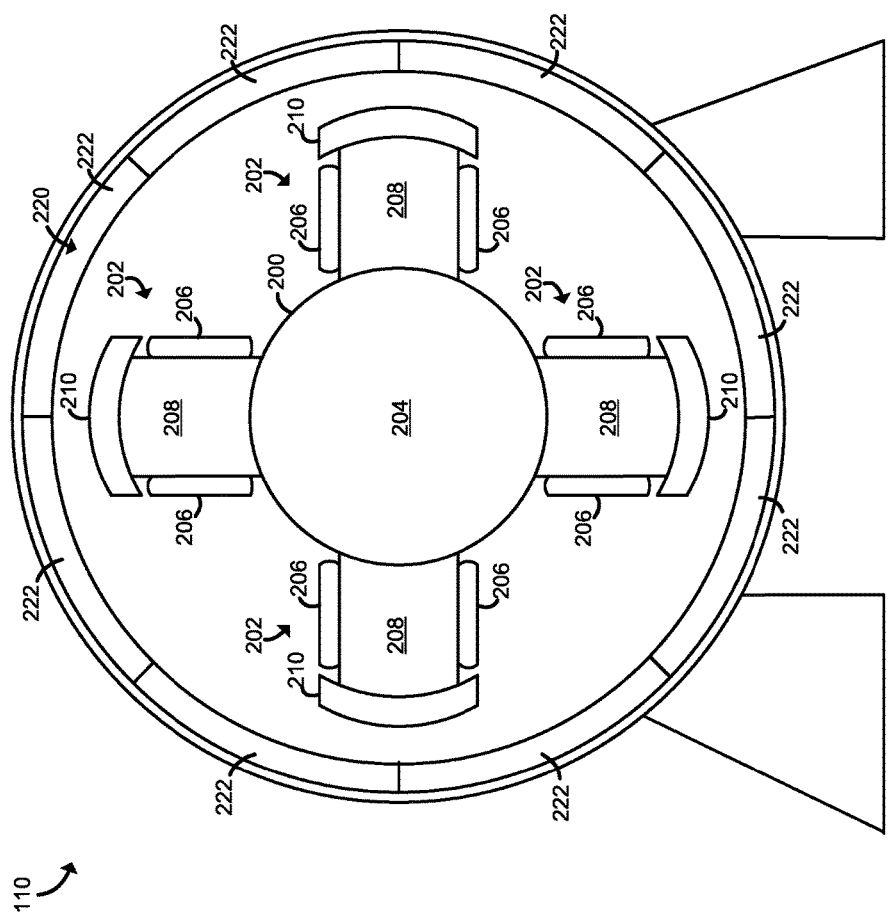
FIG. 2 is a simplified illustration of at least one embodiment of a generator of the DC power generation system of the DC power system of FIG. 1.

The generator 110 may be embodied as any type of generator capable of producing an AC output power in response to an excitation (e.g., an electrical or mechanical excitation) and including the features discussed herein. Illustratively, the generator 110 is embodied as a synchronous generator, but may be embodied as other types of generators in other embodiments. As shown in FIG. 2, the illustrative generator 110 includes a rotor 200 and a stator 220, which surrounds the rotor 200. Illustratively, the rotor 200 is embodied as a four-pole salient rotor and includes four rotor poles 202, each extending radially from an axial shaft 204. Of course, in other embodiments, the rotor 200 may have other configurations and include fewer or additional rotor poles (e.g., a two-pole or six-pole rotor). Each illustrative rotor pole 202 of the rotor 200 includes a rotor body 208 and a rotor head or end 210 facing the stator 220. Additionally, each rotor pole 202 includes a corresponding field winding 206 wrapped around the rotor body 208. Similarly, the stator 220 includes a plurality of stator or armature windings 222, which encircle the rotor 200.

In use, similar to a typical generator, the generator 110 is configured to generate an AC power output in response to rotation of the rotor 200. To do so, the field windings 206 of the rotor poles 202 are energized and the rotor 200 is rotated via an excitation (e.g., a mechanical or electrical excitation). The magnetic field created by the rotating field windings 206 of the rotor 200 cause a current flow in the stator windings 222, which produces the AC power output. Depending on the number of individual stator windings 222, the AC power output may be embodied as a single phase or multi-phase (e.g., three-phase) AC power output.

Figure 3:
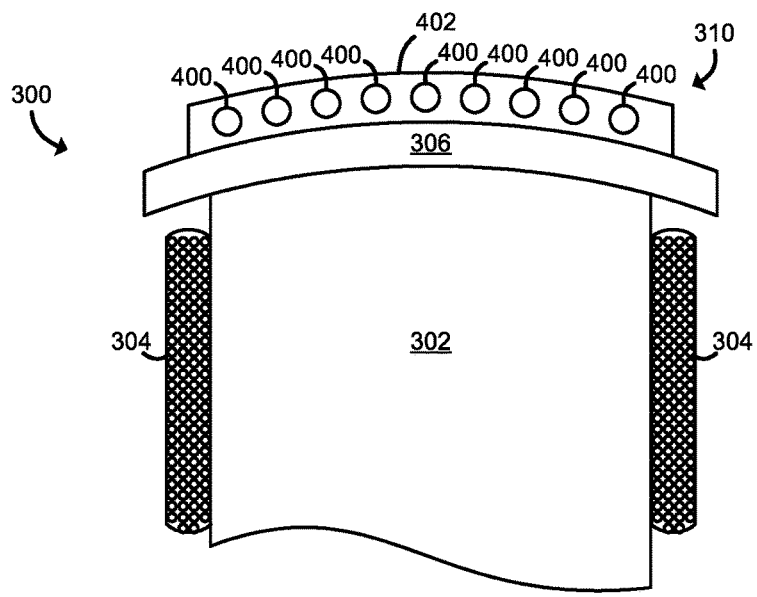
FIG. 3 is a simplified illustration of a rotor pole of a rotor of a typical generator.
Figure 4:
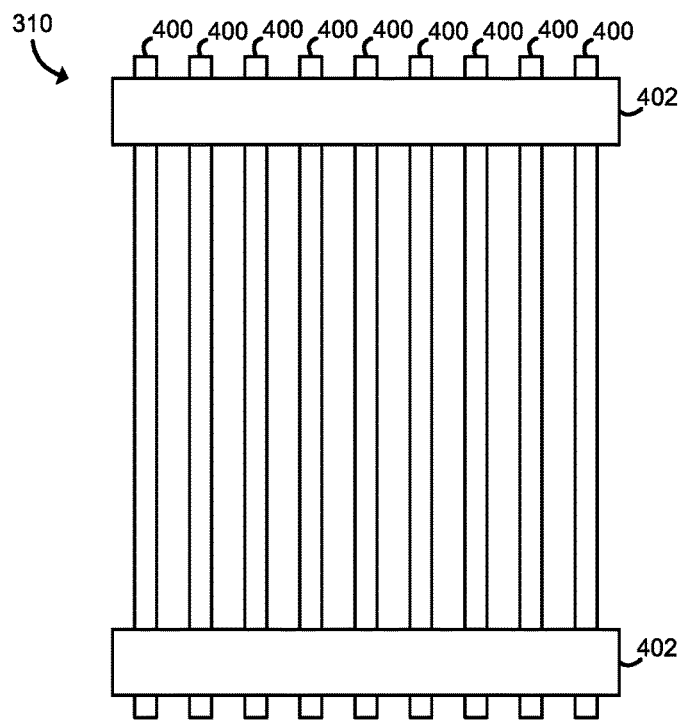
FIG. 4 is a simplified illustration of a damper winding of the rotor pole of FIG. 3.

As discussed above, typical generators include a damper winding located on each rotor pole of the rotor of the generator. For example, a typical rotor pole 300 is shown in FIG. 3. The rotor pole 300 includes a rotor body 302, field windings 304 wrapped around the rotor body 302, and a rotor head or end 306 positioned at a distal end of the rotor body 302. The rotor pole 300 also includes a typical damper winding 310 secured to the rotor head 306. As shown in FIG. 4, the typical damper winding 310 includes a plurality of damper bars or wires 400 secured in place on the rotor head 306 via a pair of end rings 402. Each end ring 402 electrically couples the damper bars 400 to each other at each end of the bars 400. As discussed above, a current is induced in the typical damper winding 310 during operation of the corresponding typical generator, which causes generation of a cancellation magnetic field to be produced to reduce the fluctuations of the air gap flux between the rotor and stator of the generator. However, as discussed above, a generator including a typical damper winding, such as damper winding 310, exhibits a high peak fault current due to the direct-quadrature (dq) axis reactance caused by the damper winding 310.

Figure 5:
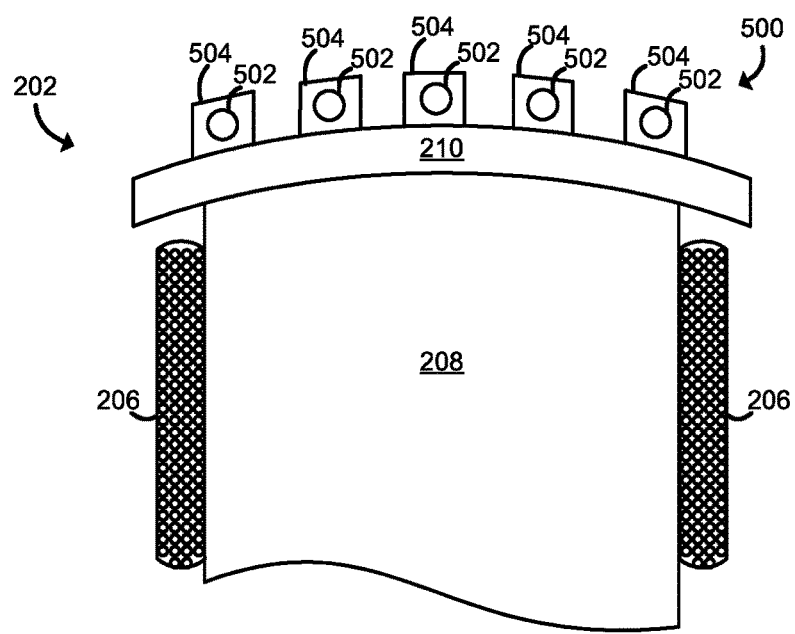
FIG. 5 is a simplified illustration of at least one embodiment of a rotor pole of a rotor of the generator of FIG. 2 having a reduced damper winding.
Figure 6:
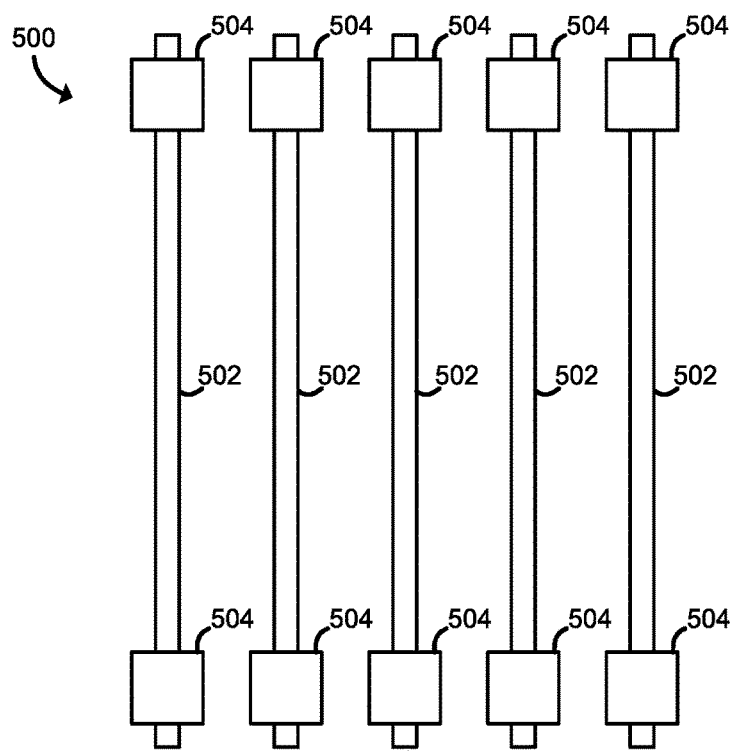
FIG. 6 is a simplified illustration of the reduced damper winding of the rotor pole of FIG. 5.

Conversely, the rotors 200 of the illustrative generator 110 of the DC power generation system 102 include a reduced (or eliminated) damper winding. For example, in an illustrative embodiment shown in FIGS. 5 and 6, each rotor pole 202 of the rotor 200 of the generator 110 may include a damper winding 500 secured to the rotor head 210. However, unlike a typical damper winding, the damper winding 500 is reduced. The damper winding 500 may be reduced in any manner that causes the damper winding 500 to generate a reduced cancellation magnetic field. For example, the damper winding 500 may include a fewer number of damper bars or wires 502. Additionally or alternatively, the pair of end rings of the damper winding 500 may include, or be embodied as, a number of separate, smaller end ring mounts such that one or more damper winding bars are electrically isolated from each other. For example, as shown in the illustrative embodiment of FIG. 5, each damper bar 502 of the damper winding 500 is secured to the corresponding rotor pole 202 via a separate end ring mount 504. That is, unlike a typical end ring (e.g., end ring 402), the end ring mounts 504 are electrically isolated from each other causing each damper bar 502 to similarly be electrically isolated from each other. For example, as best shown in FIG. 6, each end ring mount 504 is separate from each other end ring mount 504. Such isolation reduces the damping effects of the damper winding 500 by reducing the cancellation magnetic field produced by the damper winding 500 during operation.

Figure 7:
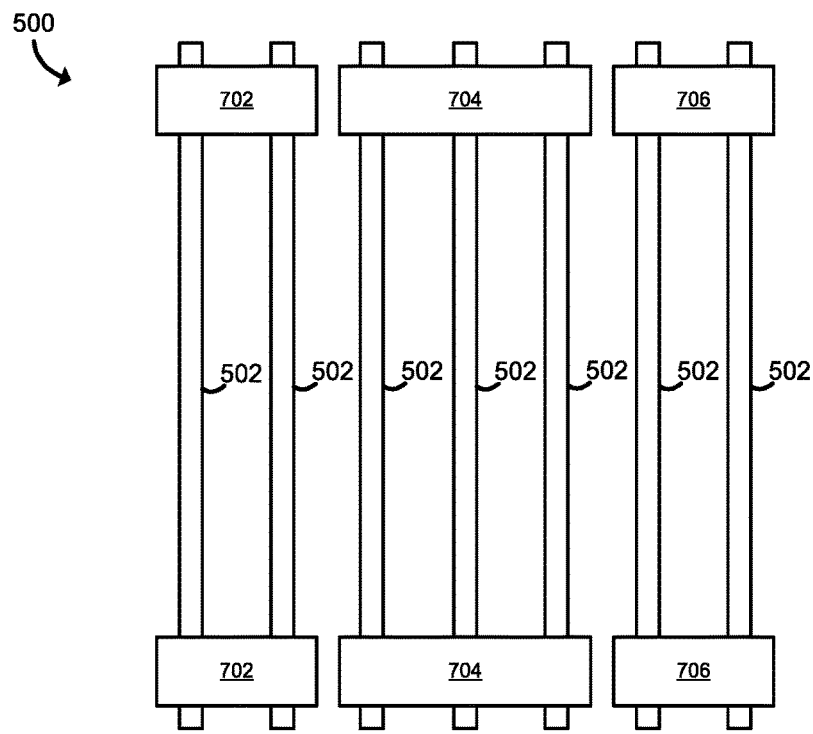
FIG. 7 is a simplified illustration of at least one other embodiment of the reduced damper winding of the rotor pole of FIG. 5.
Figure 8:
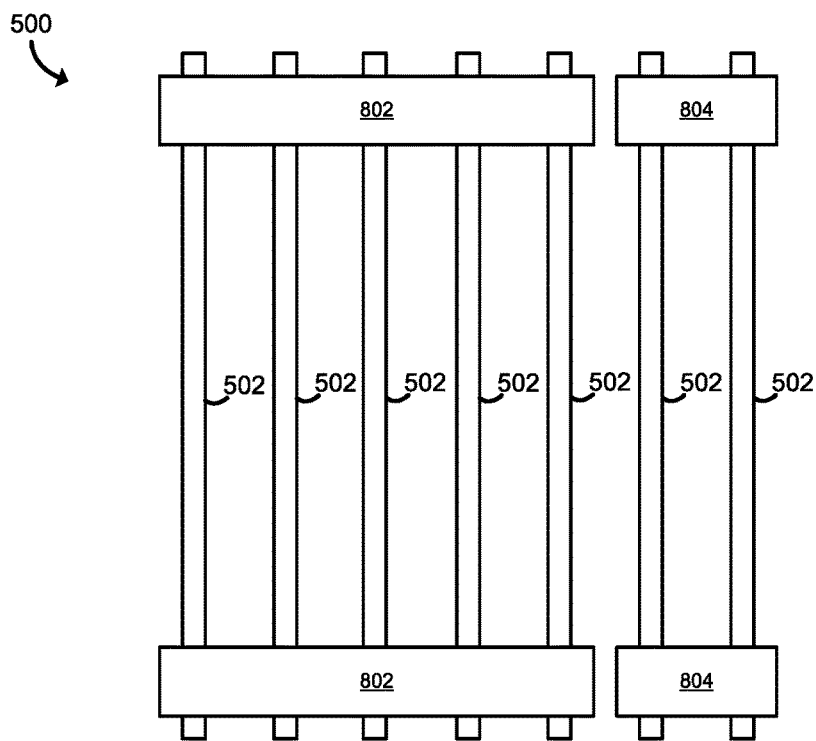
FIG. 8 is a simplified illustration of at least one other embodiment of the reduced damper winding of the rotor pole of FIG. 5.

In other embodiments, the individual damper bars 502 of the damper winding 500 may be electrically coupled together in various groupings, which are isolated from other groupings of damper bars 502. For example, as shown in FIG. 7, the end rings of the damper winding 500 are embodied as multiple end ring mounts 702, 704, 706, each of which electrically couple different groupings of the damper bars 502 of the damper winding 500. That is, the end ring mounts 702 electrically couples the two left-most damper bars 502 together, the end ring mounts 704 electrically couples the three center damper bars 502, and the end ring mounts 706 electrically couples the two right-most damper bars 502 together. The end ring mounts 702, 704, 706, however, electrically isolate their respective damper bars 502 groupings from each other. Of course, other configurations of the end ring may be used to electrically isolate groupings of the damper bars. For example, as shown in FIG. 8, the end rings of the damper winding 500 are embodied as a pair of end ring mounts 802, 804. The end ring mounts 802 electrically couple the five left-most damper bars 502 together, and the end ring mounts 804 electrically couple the two right-most damper bars 502 together while electrically isolating those damper bars 502 from the damper bars 502 of the end ring mounts 802 grouping.

In some embodiments, the configuration of the reduced damper windings 500 of each rotor pole 202 of the rotor 200 of the generator 110, which is defined by the corresponding end ring mounts, may alternate across the rotor poles 202. For example, in embodiments in which the rotor 200 includes six rotor poles, the first, third, and fifth poles 202 may have a reduced damper winding 500 that has a configuration different from the second, fourth, and sixth rotor poles 202. An illustrative embodiment of a pair of rotor poles 900, 902 having alternating damper winding configurations is shown in FIG. 9. The rotor pole 900 includes a damper winding 904 having a different configuration than a damper winding 906 of the rotor pole 902. That is, as shown in FIG. 10, the damper winding 904 includes an end ring having multiple end ring mounts 1000, 1002, and 1004. The end ring mounts 1000 electrically couple the two left-most damper bars 502 together, the end ring mounts 1002 electrically couple the center two damper bars 502 together, and the end ring mounts 1004 electrically isolates the right-most damper bar 502 from the other damper bars 502. Similarly, the end ring mounts 1002 and 1004 electrically isolate their respective damper bars 502 from the damper bars 502 of other groupings. The damper winding 906 includes an end ring having multiple end ring mounts 1010, 1012, and 1014. The end ring mounts 1010 electrically isolates the left-most damper bar 502 from other damper bars 502, the end ring mounts 1012 electrically couple the center three damper bars 502, and the end ring mounts 1014 electrically isolates the right-most damper bar 502 from other damper bars 502. As can be readily seen by comparison of the damper windings 904, 906, the damper bars 502 of the damper windings 904, 906 are grouped together in different configurations relative to each other.

Figure 11:
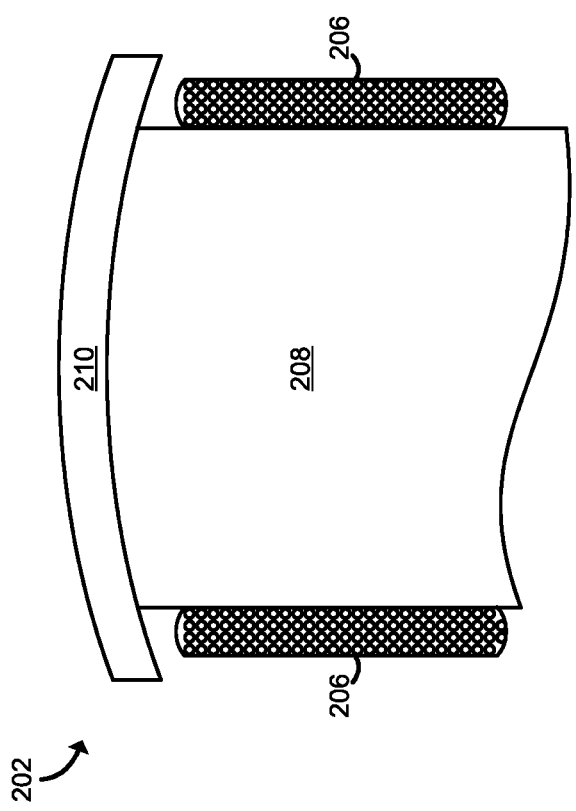
FIG. 11 is a simplified illustration of at least one other embodiment of a rotor pole of a rotor of the generator of FIG. 2 having no damper winding.

In some embodiments, the damper winding of the rotor poles 202 may be eliminated altogether. For example, as shown in FIG. 11, the generator 110 of the DC power generation system 102 may include rotor poles 202 having no damper winding 500.

Referring back to FIG. 1, the rectifier array 120 may be embodied as any number and configuration of rectifier devices and/or circuits configured to convert the AC power produced by the generator 110 to a DC power output. Illustratively, the rectifier array 120 is embodied as a collection of silicon controlled rectifier (SCRs) or thyristors arranged in a two-stage stackable rectification configuration. Of course, the rectifier array 120 may have other configurations (e.g., single or multiple stages) in other embodiments. The particular arrangement of the rectifier array 120 and the number of individual rectifier devices included in the rectifier array 120 may be dependent upon the particular application of the DC power generation system 102. Operation of the individual rectifier devices of the rectifier array 120 (i.e., the "firing" or turning on of the devices) is controlled by the rectifier controller 130.

The rectifier controller 130 may be embodied as any type of electrical device or collection of electrical devices capable of controlling the operation of the rectifier array 120 and performing the functions described herein. In some embodiments, the rectifier controller 130 may be embodied as discrete circuitry components (e.g., a collection of interconnected logic gates, transistors, etc.). In other embodiments, the rectifier controller 130 may be embodied as or otherwise include a processor 132 and a memory 134, as well as other electrical component or circuitry commonly found in a controller or other computing device (e.g., I/O subsystem, peripheral devices, etc.). In such embodiments, the processor 132 may be embodied as any type of physical processor capable of performing the functions described herein. For example, the processor 132 may be embodied as a single or multi-core processor(s), a single or multi-socket processor, a digital signal processor, a microcontroller, or other processor or processing/controlling circuit. Similarly, the memory 134 may be embodied as any type of volatile or non-volatile memory or data storage capable of performing the functions described herein. In operation, the memory 134 may store various data, firmware, and/or and software used during operation of the rectifier controller such as operating systems, applications, programs, libraries, and drivers. In some embodiments, the processor 132 and memory 134 may form a portion of a system-on-a-chip (SoC) and be incorporated, along with other components of the rectifier controller 130, on a single integrated circuit chip.

In use, the rectifier controller 130 is configured to control operation of the rectifier array 120 to reduce oscillations in the DC power output of the DC power generation system 102 caused by the reduced damper winding of the generator 110. To do so, as discussed in more detail below, the rectifier controller 130 generates a correction signal based on an oscillation component of the DC power output and adjusts a reference firing angle set point of the rectifier array 120 based on the oscillation component.

Although the illustrative DC power generation system 102 includes a single generator 110, it should be appreciated that the DC power generation system 102 may include multiple generators 110 in other embodiments, such as in industrial applications. In such embodiments, the rectifier array 120 may include multiple rectification stages to support conversion of the AC power output from the multiple generators 110 to a single or multiple DC power output.

The DC load 104 may be embodied as any type of load or other power sink (e.g., a DC power distribution grid) capable of receiving DC power from the DC power generation system 102. During operation of the DC power system 100, the DC load 104 may experience a fault condition resulting from a short circuit. However, as discussed above and in more detail below, the reduced damper winding of the generator 110 reduces the peak output current resulting from such fault conditions.

The excitation system 106 may be embodied as any type of device or collection of devices capable of generating an excitation to cause the rotation of the rotor 200 of the generator 110. As discussed above, such excitation may be electrical or mechanical.

Figure 12:
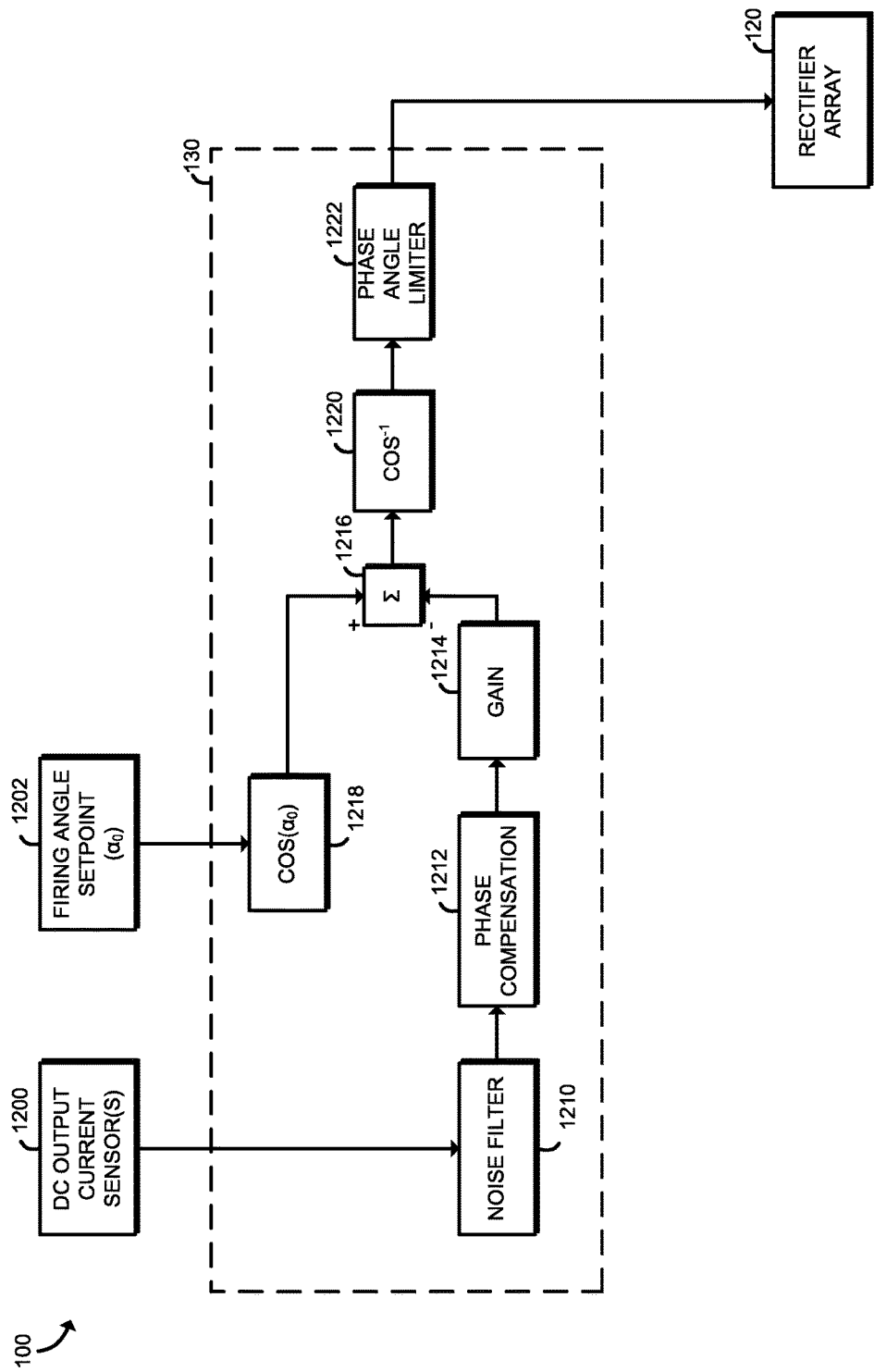
FIG. 12 is a simplified block diagram of at least one embodiment of a rectifier controller of the DC power generation system of FIG. 1.

Referring now to FIG. 12, as discussed above, the rectifier controller 130 is configured to control the operation of the rectifier array 120. To do so, the rectifier controller 130 generates one or more control signals based on a firing angle set point 1202 of the rectifier array 120 and the oscillation component of the DC power output of the DC power generation system 102. The illustrative rectifier controller 130 includes a noise filter logic block 1210 configured to receive a measurement signal from one or more DC output current sensors 1200. The DC output current sensor(s) 1200 may be embodied as any type of current sensor capable of producing a measurement signal indicative of the DC current of the DC power output of the DC power generation system 102. The noise filter logic block 1210 is configured to filter high-frequency oscillations from the measurement signal. The particular cut-off frequency of the noise filter logic block 1210 may be dependent upon aspects of the DC power generation system 102, such as the type of generator 110, the application of the system 102, etc.

The illustrative rectifier controller 130 also includes a phase compensation logic block 1212 and a gain logic block 1214. The phase compensation logic block 1212 is configured to compensate or adjust the phase of the measurement signal to account for measurement and/or control delay of the filtered measurement signal. The gain logic block 1214 applies a gain or boost to the compensated measurement signal to generate an oscillation correction signal. It should be appreciated that the gain logic block 1214 applies a gain to both the DC component and the oscillation component of the measurement signal. As such, the gain logic block 1214 applies both an oscillation damping gain to compensate for oscillations in the DC power output and a power-sharing droop gain to adjust the voltage level of the DC power output.

The oscillation correction signal is subtracted from the firing angle command value by a summation logic block 1216 of the illustrative rectifier controller 130. The firing angle command value is generated by a cosine logic block 1218 of the illustrative rectifier controller 130, which is configured to determine the cosine of a firing angle set point 1202. The firing angle set point 1202 defines the phase angle at which the individual rectifier components of the rectifier array 120 are to "fire" or otherwise turn on. In the illustrative embodiment, the firing angle set point 1202 may be a reference or pre-defined value, which may be stored in the rectifier controller 130 (e.g., in the memory 134) or obtain from a remote source. In some embodiments, the firing angle set point 1202 may be adjusted over time via communication with the controller 130.

As discussed above, the summation logic block 1216 subtracts the oscillation correction signal and the firing angle command value to generate a corrected command value. The corrected command value is converted to a firing angle via an inverse cosine logic block 1220, which generates a command firing angle. The command firing angle is limited by a phase angle limiter logic block 1222 to generate the control signal, which is supplied to the rectifier array 120 to control the firing or operation of the rectifier devices of the rectifier array 120. Illustratively, the phase angle limiter logic block 1222 limits the magnitude of the command firing angle within a reference angle range (e.g., between 0 and 90 degrees). The particular reference angle range used by the phase angle limiter logic block 1222 may be dependent upon various operational characteristics of the DC power generation system 102.

It should be appreciated that each of the logic blocks of the illustrative rectifier controller 130 of FIG. 12 may be embodied as individual circuits or electrical devices or components, which may form a larger circuit or electrical component (e.g., an integrated circuit). Additionally or alternatively, a portion of the logic blocks of the rectifier controller 130 of FIG. 12 may be embodied as software or firmware established and executed by the controller 130 (e.g., by the processor 132).

Figure 13:
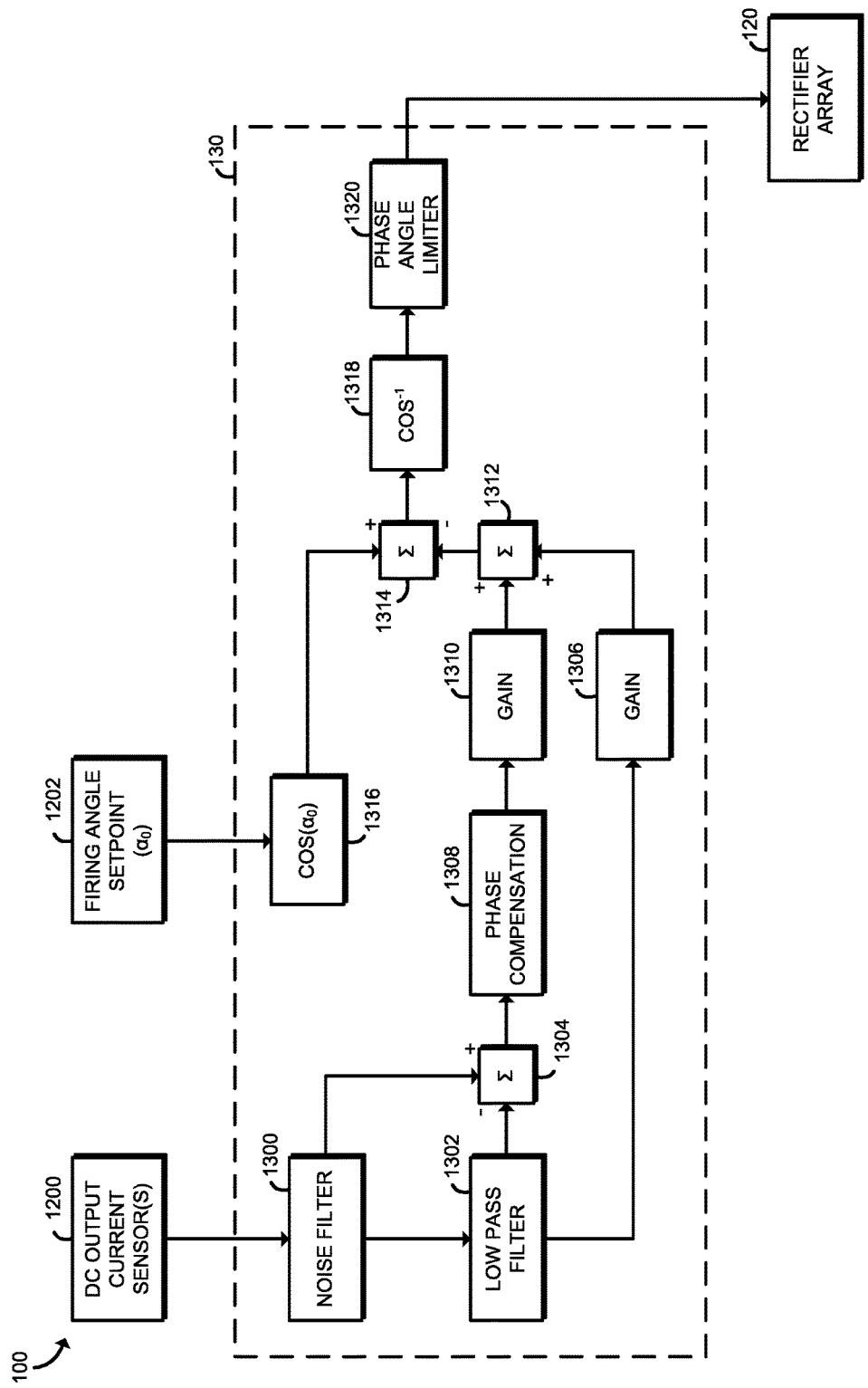
FIG. 13 is a simplified block diagram of at least one additional embodiment of the rectifier controller of the DC power generation system of FIG. 1.

Referring now to FIG. 13, in some embodiments, the rectifier controller 130 may include separate gains for the DC component and the oscillation component of the measurement signal to provide additional control of the oscillation correction signal. Similar to the rectifier controller 130 of FIG. 12, the illustrative rectifier controller 130 of FIG. 13 includes a noise filter logic block 1300. The noise filter logic block 1300 is configured to receive the measurement signal from the DC output current sensor(s) 1200 and filter high-frequency oscillations from the measurement signal.

The illustrative rectifier controller 130 of FIG. 13 is configured to separate the filtered measurement signal into a DC component signal and an oscillation component signal as discussed above. To do so, the rectifier controller 130 of FIG. 13 includes a low pass filter logic block 1302 to receive the filtered measurement signal from the noise filter logic block 1300 and filter high frequencies from the measurement signal to generate the DC component signal (i.e., the DC component of the measured DC current of the DC output of the system 102). Additionally, the rectifier controller 130 includes a summation logic block 1304, which receives the filtered measurement signal from the noise filter logic block 1300 and the DC component signal from the low pass filter logic block 1302. The summation logic block 1304 is configured to subtract the DC component signal from the filtered measurement signal to generate the oscillation component signal (i.e., the oscillation component of the measured DC current of the DC output of the system 102).

The DC component signal generated by the low pass filter logic block 1302 is also provided to a voltage droop gain logic block 1306. The voltage droop gain logic block 1306 applies a gain or boost to the DC component signal generate an adjusted DC component signal. Similarly, the oscillation component signal generated by the summation logic block 1304 is provided to a phase compensation logic block 1308, which is configured to compensate or adjust the phase of the oscillation component signal to account for measurement and/or control delay of the measurement signal as discussed above in regard to the phase compensation logic block 1212 of FIG. 12. The compensated oscillation component signal is provided to an oscillation damping gain logic block 1310, which applies a gain or boost to the oscillation component signal generate an adjusted oscillation component signal.

The adjusted oscillation component signal and the adjusted DC component signal are summed together by a summation logic block 1312 to generate the oscillation correction signal. The oscillation correction signal is summed with a firing angle command value by a summation logic block 1314. As discussed above in regard to the rectifier controller 130 of FIG. 12, the firing angle command value is generated by a cosine logic block 1316, which is configured to determine the cosine of a firing angle set point 1202.

As discussed above, the summation logic block 1314 sums the oscillation correction signal and the firing angle command value to generate a corrected command value. The corrected command value is converted to a firing angle via an inverse cosine logic block 1318, which generates a command firing angle. The command firing angle is limited by a phase angle limiter logic block 920 to generate the control signal, which is supplied to the rectifier array 120 to control the firing or operation of the rectifier devices of the rectifier array 120.

Figure 14:
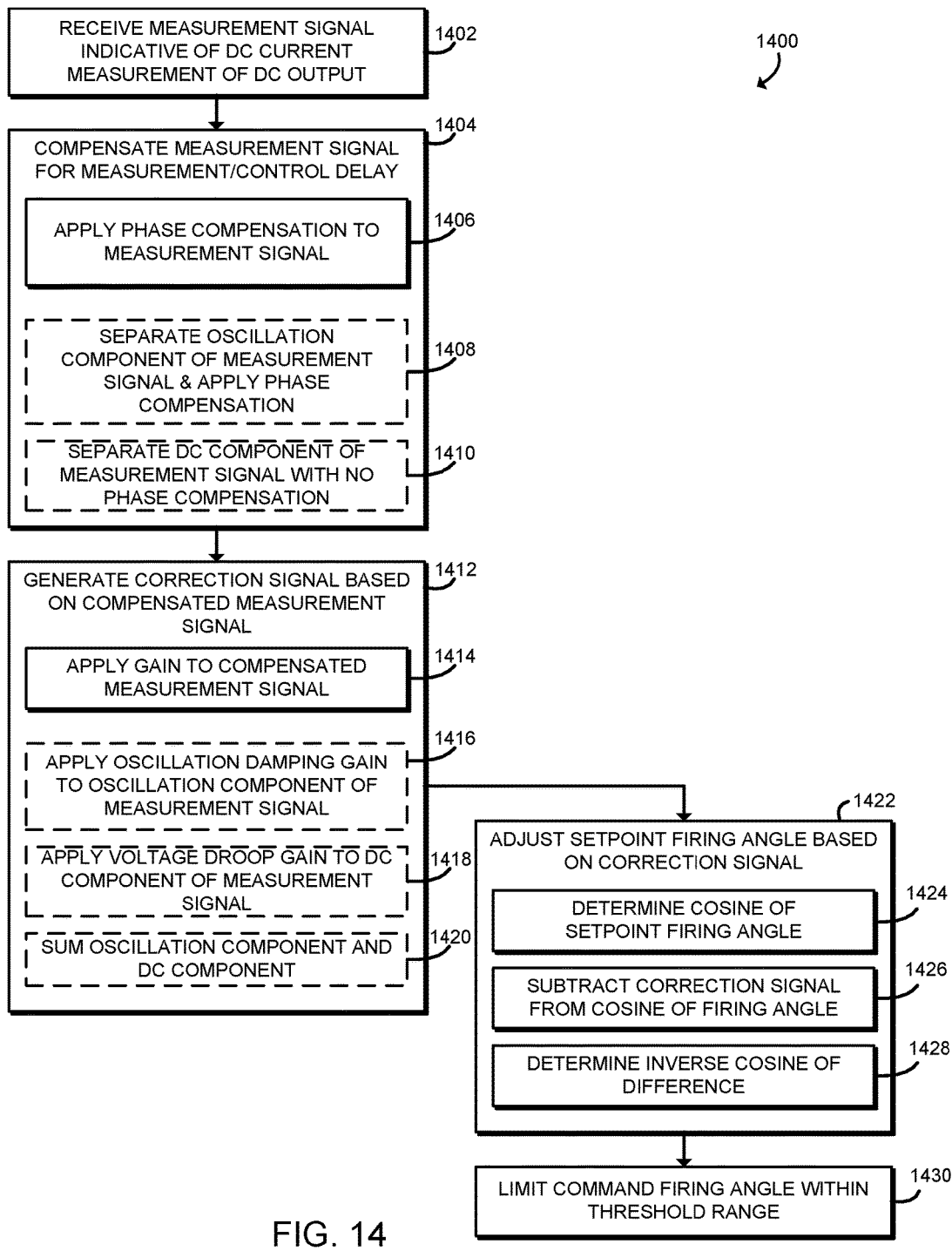
FIG. 14 is a simplified flow diagram of at least one embodiment of a method for reducing peak fault output current of the DC power generation system that may be executed by the rectifier controller of the Dc power generation system of FIG. 1.

As discussed above in regard to the illustrative rectifier controller 130 of FIG. 12, it should be appreciated that each of the logic blocks of the illustrative rectifier controller 130 of FIG. 13 may be embodied as individual circuits or electrical devices or components, which may form a larger circuit or electrical component (e.g., an integrated circuit). Additionally or alternatively, a portion of the logic blocks of the rectifier controller 130 of FIG. 13 may be embodied as software or firmware established and executed by the controller 130 (e.g., by the processor 132). For example, in embodiments in which the rectifier controller 130 includes the processor 132 and memory 134, a portion of the logic blocks of the rectifier controller 130 of FIG. 12 or 13 may be embodied as software instructions stored in the memory 134 and executable by the processor 132 to perform the functions of the logic blocks of FIG. 12 or 13. In such embodiments, the rectifier controller 130 may be configured to execute a method 1400 to generate a control signal for controlling the operation of the rectifier array 120 as shown in FIG. 14.

The method 1400 begins with block 1402 in which the rectifier controller 130 receives a measurement signal from the DC current sensor(s) 1200, which is indicative of the DC current of the DC power output of the DC power generation system 102. In block 1404, rectifier controller 130 compensates the measurement signal for measurement and/or control delay. To do so, the rectifier controller 130 may apply a phase compensation to the measurement signal in block 1406. In some embodiments, as discussed above in regard to FIG. 13, the rectifier controller 130 may be configured to separate the measurement signal into various components. In such embodiments, the rectifier controller 130 may separate an oscillation component signal from the measurement signal and apply a phase compensation to the oscillation component signal in block 1408. Additionally, the rectifier controller 130 may separate a DC component signal from the measurement signal in block 1410. In such embodiments, no phase compensation is applied to the DC component signal.

Subsequently, in block 1412, the rectifier controller 130 generates a correction signal based on the compensated measurement signal. To do so, the rectifier controller 130 may apply a gain to the compensated measurement signal in block 1414. In embodiments, in which the measurement signal is not separated into individual components (see FIG. 12), the gain is applied to both the DC component and the oscillation component of the measurement signal in block 1414. However, in embodiments in which the measurement signal is separated into individual components (see FIG. 13), the rectifier controller 130 may apply an oscillation damping gain to the oscillation component of the measurement signal in block 1416 and apply a voltage droop gain to the DC component of the measurement signal in block 1418. The oscillation component signal and the DC component signal are subsequently summed in block 1420 to generate the correction signal.

In block 1422, the rectifier controller 130 adjusts the set point firing angle based on the correction signal generated in block 1412. To do so, the rectifier controller 130 determines the cosine of the set point firing angle in block 1424 and subtracts the correction signal from the cosine of the set point firing angle in block 1426. The rectifier controller 130 subsequently determines the inverse cosine of the difference of the cosine of the firing angle and the correction signal in block 1428 to generate a command firing angle. The command firing angle is limited within a reference angle range in block 1430 and subsequently provided to the rectifier array 120 to control operation thereof.

As discussed above, the reduction (or removal) of the damper winding of the generator 110 reduces the peak fault output current of the generator 110. For example, a graph 1500 of a simulated output current of a typical six-phase generator having a typical damper winding is shown in FIG. 15. Additionally, a graph 1600 of a simulated output current of a six-phase generator 110 having no damper winding is shown in FIG. 16. A comparison of the graphs 1500, 1600 illustrates that the typical generator produces a greater peak fault current during the initial stages of a fault condition relative to the illustrative generator 110.

The invention claimed is:

1. A direct current (DC) power generation system for reducing peak fault output current, the DC power generation system comprising:
a generator configured to generate an alternating current (AC) power output in response to an excitation, wherein the generator includes a plurality of rotor poles and each rotor pole includes a corresponding damper winding, wherein each damper winding includes a plurality of damper bars secured to the corresponding rotor pole by a pair of end rings, wherein each end ring comprises at least two end ring mounts electrically isolated from each other and wherein each end ring mount secures at least one damper winding to the corresponding rotor pole;
a rectifier array configured to convert the AC power output to a DC power output in response to a control signal; and
a controller electrically coupled to rectifier array to control operation of the rectifier array, wherein the controller is configured to generate the control signal based on an oscillation component of the DC power output.

2. The DC power generation system of claim 1, wherein each end ring comprises a plurality of end ring mounts and each end ring mount secures one of the plurality of damper bars to the corresponding rotor pole, wherein each end ring mount is electrically isolated from each other end ring mount.

3. The DC power generation system of claim 1, wherein the at least two end ring mounts includes a first end ring mount and a second end ring mount and each of the first and second end ring mounts secure a different number of damper bars to the corresponding rotor pole.

4. The DC power generation system of claim 1, wherein the end ring mounts of the end ring define a damper winding configuration of the corresponding damper winding, and wherein at least two rotor poles of the plurality of rotor poles include damper windings having different damper winding configurations.

5. The DC power generation system of claim 1, wherein the controller is configured to generate an oscillation correction signal and adjust a firing angle set point based on the oscillation correction signal to generate the control signal.

6. The DC power generation system of claim 5, wherein the controller is configured to receive a measurement signal indicative of a DC current of the DC power output, apply a phase compensation to the measurement signal to generate a compensated measurement signal, and apply a gain to the compensated measurement signal to generate the oscillation correction signal.

7. The DC power generation system of claim 6, wherein the controller comprises:
   a noise filter configured to receive the measurement signal and filter the measurement signal to generate a filtered measurement signal;
   a phase compensation circuit coupled to the noise filter to receive the filtered measurement signal and configured to apply the phase compensation to the filtered measurement signal to generate the compensated measurement signal; and
   a gain circuit coupled to the phase compensation circuit to receive the compensated measurement signal and configured to apply the gain to the compensated measurement signal to generate the oscillation correction signal.

8. The DC power generation system of claim 5, wherein the controller is configured to receive a measurement signal indicative of a DC current of the DC power output, separate the measurement signal into a DC component signal and an oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal.

9. The DC power generation system of claim 8, wherein the controller comprises:
   a noise filter configured to receive the measurement signal and filter the measurement signal to generate a filtered measurement signal;
   a low pass filter coupled to the noise filter to receive the filtered measurement signal and filter the filtered measurement signal to generate the DC component signal;
   a first summation circuit coupled to the noise filter to receive the filtered measurement signal and to the low pass filter to receive the DC component signal, wherein the first summation circuit is configured to subtract the DC component signal from the filtered measurement signal to generate the oscillation component signal;
   a phase compensation circuit coupled to the first summation circuit to receive the oscillation component signal and configured to apply the phase compensation to the oscillation component signal to generate the compensated oscillation component signal;
   an oscillation damping gain circuit coupled to the phase compensation circuit to receive the compensated oscillation component signal and configured to apply the oscillation damping gain to the compensated oscillation component signal to generate the adjusted oscillation component signal;
   a voltage droop gain circuit coupled to the low pass filter to receive the DC component signal and configured to apply the voltage droop gain to the DC component signal to generate the adjusted DC component signal; and
   a second summation circuit coupled to the oscillation damping gain circuit to receive the adjusted oscillation component signal and to the voltage droop gain circuit to receive the adjusted DC component signal, wherein the second summation circuit is configured to sum the adjusted oscillation component signal and the adjusted DC component signal to generate the oscillation correction signal.

10. The DC power generation system of claim 5, wherein the controller is configured to determine the cosine of the firing angle set point to generate a command value, subtract the oscillation correction signal from the command value to generate a corrected command value, determine an inverse cosine of the target value to generate a command firing angle, and apply a phase limiter to the command firing angle to limit the command firing angle within a reference angle range to generate the control signal.

11. A direct current (DC) power generation system for generating a DC power output having reduced peak fault output current, the DC power generation system comprising:
   a controller coupled to a rectifier array of the DC power generation system and to generate a control signal to control operation of the rectifier array to generate the DC power output, wherein the controller is configured to generate an oscillation correction signal and adjust a firing angle set point based on the oscillation correction signal to generate the control signal.

12. The DC power generation system of claim 11, wherein the controller is configured to receive a measurement signal indicative of a DC current of the DC power output, apply a phase compensation to the measurement signal to generate a compensated measurement signal, and apply a gain to the compensated measurement signal to generate the oscillation correction signal.

13. The DC power generation system of claim 11, wherein the controller is configured to receive a measurement signal indicative of a DC current of the DC power output, separate the measurement signal into a DC component signal and an oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal.

14. A direct current (DC) power generation system for reducing peak fault output current, the DC power generation system comprising:
   a generator configured to generate an alternating current (AC) power output in response to an excitation, wherein the generator includes a plurality of rotor poles and each rotor pole has no damper winding;
   a rectifier array configured to convert the AC power output to a DC power output in response to a control signal; and
   a controller electrically coupled to rectifier array to control operation of the rectifier array, wherein the controller is configured to generate the control signal based on an oscillation component of the DC power output.

15. The DC power generation system of claim 14, wherein the controller is configured to generate an oscillation correction signal and adjust a firing angle set point based on the oscillation correction signal to generate the control signal.

16. The DC power generation system of claim 15, wherein the controller is configured to receive a measurement signal indicative of a DC current of the DC power output, apply a phase compensation to the measurement signal to generate a compensated measurement signal, and apply a gain to the compensated measurement signal to generate the oscillation correction signal.

17. The DC power generation system of claim 16, wherein the controller comprises:
   a noise filter configured to receive the measurement signal and filter the measurement signal to generate a filtered measurement signal;
   a phase compensation circuit coupled to the noise filter to receive the filtered measurement signal and configured to apply the phase compensation to the filtered measurement signal to generate the compensated measurement signal; and
   a gain circuit coupled to the phase compensation circuit to receive the compensated measurement signal and configured to apply the gain to the compensated measurement signal to generate the oscillation correction signal.

18. The DC power generation system of claim 15, wherein the controller is configured to receive a measurement signal indicative of a DC current of the DC power output, separate the measurement signal into a DC component signal and an oscillation component signal, apply a phase compensation to the oscillation component signal to generate a compensated oscillation component signal, apply an oscillation damping gain to the compensated oscillation component signal to generate an adjusted oscillation component signal, apply a voltage droop gain to the DC component signal to generate an adjusted DC component signal, and sum the adjusted oscillation component signal and the adjusted DC component signal to generate the oscillation correction signal.

19. The DC power generation system of claim 18, wherein the controller comprises:
   a noise filter configured to receive the measurement signal and filter the measurement signal to generate a filtered measurement signal;
   a low pass filter coupled to the noise filter to receive the filtered measurement signal and filter the filtered measurement signal to generate the DC component signal;
   a first summation circuit coupled to the noise filter to receive the filtered measurement signal and to the low pass filter to receive the DC component signal, wherein the first summation circuit is configured to subtract the DC component signal from the filtered measurement signal to generate the oscillation component signal;
   a phase compensation circuit coupled to the first summation circuit to receive the oscillation component signal and configured to apply the phase compensation to the oscillation component signal to generate the compensated oscillation component signal;
   an oscillation damping gain circuit coupled to the phase compensation circuit to receive the compensated oscillation component signal and configured to apply the oscillation damping gain to the compensated oscillation component signal to generate the adjusted oscillation component signal;
   a voltage droop gain circuit coupled to the low pass filter to receive the DC component signal and configured to apply the voltage droop gain to the DC component signal to generate the adjusted DC component signal; and
   a second summation circuit coupled to the oscillation damping gain circuit to receive the adjusted oscillation component signal and to the voltage droop gain circuit to receive the adjusted DC component signal, wherein the second summation circuit is configured to sum the adjusted oscillation component signal and the adjusted DC component signal to generate the oscillation correction signal.

20. The DC power generation system of claim 15, wherein the controller is configured to determine the cosine of the firing angle set point to generate a command value, subtract the oscillation correction signal from the command value to generate a corrected command value, determine an inverse cosine of the target value to generate a command firing angle, and apply a phase limiter to the command firing angle to limit the command firing angle within a reference angle range to generate the control signal.

* * * * *